United States Patent
Dethier et al.

(10) Patent No.: US 10,584,017 B2
(45) Date of Patent: Mar. 10, 2020

(54) MAINTENANCE METHOD AND SYSTEM FOR SOLAR RECEIVER

(71) Applicant: Cockerill Maintenance & Ingenierie S.A., Seraing (BE)

(72) Inventors: Alfred Dethier, Sprimont (BE); Stéphane Winand, Angleur (BE); Yves Lecloux, Embourg (BE)

(73) Assignee: COCKERILL MAINTENANCE & INGENIERIE S.A., Seraing (BE)

( * ) Notice: Subject to any disclaimer, the term of this patent is extended or adjusted under 35 U.S.C. 154(b) by 0 days.

(21) Appl. No.: 15/777,925

(22) PCT Filed: Nov. 17, 2016

(86) PCT No.: PCT/EP2016/077982
§ 371 (c)(1),
(2) Date: May 22, 2018

(87) PCT Pub. No.: WO2017/093033
PCT Pub. Date: Jun. 8, 2017

(65) Prior Publication Data
US 2018/0346289 A1    Dec. 6, 2018

(30) Foreign Application Priority Data
Nov. 30, 2015    (BE) .................................. 2015/5776

(51) Int. Cl.
*B66C 23/20*    (2006.01)
*F24S 40/00*    (2018.01)
(Continued)

(52) U.S. Cl.
CPC .............. *B66C 23/205* (2013.01); *B66D 1/60* (2013.01); *F24S 20/20* (2018.05); *F24S 40/00* (2018.05); *F24S 2025/01* (2018.05); *Y02E 10/41* (2013.01)

(58) Field of Classification Search
CPC .......... B66C 23/205; B66D 1/60; F24S 20/20; F24S 40/00; F24S 2025/01; Y02E 10/41
See application file for complete search history.

(56) References Cited

U.S. PATENT DOCUMENTS

| 2,569,821 A | * | 10/1951 | Maxeiner | ............. B66C 23/205 |
| | | | | 182/142 |
| 3,420,332 A | * | 1/1969 | Textor | ...................... B66B 9/00 |
| | | | | 182/128 |

(Continued)

FOREIGN PATENT DOCUMENTS

| CN | 201406267 Y | 2/2010 |
| CN | 203269405 U | 11/2013 |

(Continued)

*Primary Examiner* — Basil S Katcheves
*Assistant Examiner* — Omar F Hijaz
(74) *Attorney, Agent, or Firm* — Leydig, Voit & Mayer, Ltd.

(57) ABSTRACT

A tower for a concentrated solar power plant includes: an upper external platform on which is arranged an essentially cylindrical solar receiver with an external side surface and an upper base, the side surface of the receiver including a plurality of removably mounted receiving panels; and a placement and maintenance system for the receiving panels. The placement and maintenance system for the receiving panels includes a crane mounted so as to be rotatable 360° and guided using at least two concentric rails, on the upper base of the receiver.

10 Claims, 7 Drawing Sheets

(51) Int. Cl.
*F24S 20/20* (2018.01)
*B66D 1/60* (2006.01)
*F24S 25/00* (2018.01)

(56) References Cited

U.S. PATENT DOCUMENTS

| | | | | |
|---|---|---|---|---|
| 4,004,778 | A | * | 1/1977 | Steinhagen ............ B66C 23/205 |
| | | | | 212/294 |
| 4,315,533 | A | * | 2/1982 | Eagles ..................... B67D 9/02 |
| | | | | 137/615 |
| 4,329,795 | A | * | 5/1982 | Kalve ..................... E02F 9/121 |
| | | | | 212/175 |
| 4,769,932 | A | * | 9/1988 | Kalve ....................... E02F 3/46 |
| | | | | 212/175 |
| 8,544,237 | B2 | | 10/2013 | Zillmer et al. |
| 2010/0170188 | A1 | * | 7/2010 | Zilmer ................... B66C 23/18 |
| | | | | 52/745.17 |
| 2011/0297206 | A1 | * | 12/2011 | Devine ................... B66C 23/18 |
| | | | | 136/246 |
| 2014/0020675 | A1 | * | 1/2014 | Sonwane ................ F24S 80/60 |
| | | | | 126/652 |
| 2015/0252582 | A1 | * | 9/2015 | Stiesdal ................ E04H 12/341 |
| | | | | 52/378 |
| 2015/0300036 | A1 | * | 10/2015 | Khoshnevis ........ E04G 21/0463 |
| | | | | 425/63 |

FOREIGN PATENT DOCUMENTS

| | | | |
|---|---|---|---|
| CN | 104555715 A | 4/2015 | |
| FR | 2329579 A1 | 5/1977 | |
| GB | 1535576 A | 12/1978 | |

* cited by examiner

MAINTENANCE METHOD AND SYSTEM FOR SOLAR RECEIVER

CROSS-REFERENCE TO PRIOR APPLICATIONS

This application is a U.S. National Phase application under 35 U.S.C. § 371 of International Application No. PCT/EP2016/077982, filed on Nov. 17, 2016, and claims benefit to Belgian Patent Application No. 2015/5776, filed on Nov. 30, 2015. The International Application was published in French on Jun. 8, 2017 as WO 2017/093033 under PCT Article 21(2).

FIELD

The present invention relates to the field of solar power plants, and in particular of tower concentrated solar power plants (CSP Towers). It relates in particular to the installation and maintenance of the elements external to the solar tower.

The invention also applies to any technical application that requires the same type of lifting or maintenance intervention.

BACKGROUND

The installation and maintenance of solar receivers is a major issue in the proper operation of tower solar power plants. The proper performance of these two operations guarantees optimal performances by the plant for as long as possible.

Several solutions based on the use of a crane exist in several fields: construction, wind energy, etc. In the solar field, and in particular in tower solar power plants, cranes are generally used in the construction, installation and assembly of solar receivers atop the tower.

In the case of the solar receivers of the cavity type (for example, Khi Solar One project in South Africa) or small external receivers, a large crane higher than the tower is installed in order to perform the assembly operations of the receiver. This is applicable in the case of installation atop the tower before commissioning. Once this installation is complete, the assembly tower is disassembled and the maintenance operations will be performed through access doors in the tower and in the receiver. The equipment is mounted atop the tower using a lifting device.

For the solar receiver of the external type, a solution with a crane mounted atop the tower has been developed by the company SolarReserve, California, USA. This solution was the subject of two patents that were filed in 2009 (U.S. Pat. No. 8,544,237 B2) and 2010 (US 2011/0297206 A1) in the USA and Spain.

The first of these patents presents a lifting method and a lifting system installed on a solar tower for replacing panels of the solar receiver. The system is made up of:
  a guide track installed over the entire height of the tower, along which a receiving panel can be moved from the ground using a wheeled carriage moving by going up the track and by a first cable actuated by a winch situated at the apex of the tower;
  a crane installed atop the receiver, which is in turn situated on the upper base of the tower, capable of rotating 360 degrees and attached to a second cable. Once the receiving panel is conveyed to the apex of the tower by the guide and lifting system described above, it is borne by the crane, which conveys it to the location provided for its positioning. Of course, the operations are done in reverse to disassemble a panel located on the receiver.

The second patent, which is based on the first one, presents a method and system for replacing panels of a solar receiver external to the tower. The system is made up of:
  a crane installed atop the tower to support the panel. The crane body can move horizontally and rotatably for example using a turntable, which allows it to access all of the panel locations;
  a carriage with a support frame that maintains and transports the panel;
  circular rails installed atop the tower, around the receiver, to guide the carriage.

The panel replacement method consists of:
  deploying the crane;
  attaching and supporting the panel using the crane;
  moving and depositing the panel on the carriage;
  moving the carriage-panel assembly and passing the panel through an access hatch or positioning it using the crane.

Although this solution is very interesting, it does not make it possible to:
  transport large-size panels;
  perform maintenance operations directly on the receiver.

Document CN 203269405 U describes a crane intended to assemble side panels moving on concentric paths. This document is part of the general state of the art, since the crane is balanced by a central anchor.

Two other documents relate to the steelyard-lever scale system at the load. Document CN 201406267 U presents a system making it possible to handle a tool such as a lubrication pump with a certain degree of freedom provided by the steelyard-lever scale system (orifices for placing weights are provided in the median part of the beam of the scale). Document CN 104555715 A also presents an offset system for the load using a steelyard-lever scale. However, the scale remains horizontal throughout the entire maneuvering in both cases.

Lastly, in document FR 2 329 579 A1, the interest lies in assembling crane elements in the vertical and offset plane owing to an effect of the lever.

SUMMARY

In an embodiment, the present invention provides a tower for a concentrated solar power plant, comprising: an upper external platform on which is arranged an essentially cylindrical solar receiver with an external side surface and an upper base, the side surface of the receiver comprising a plurality of removably mounted receiving panels; and a placement and maintenance system for the receiving panels, wherein the placement and maintenance system for the receiving panels comprises a crane mounted so as to be rotatable 360° and guided using at least two concentric rails, on the upper base of the receiver.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2A illustrates the system of FIG. 1 with the crane in the rest or standby position, while

DETAILED DESCRIPTION

Figure 1:
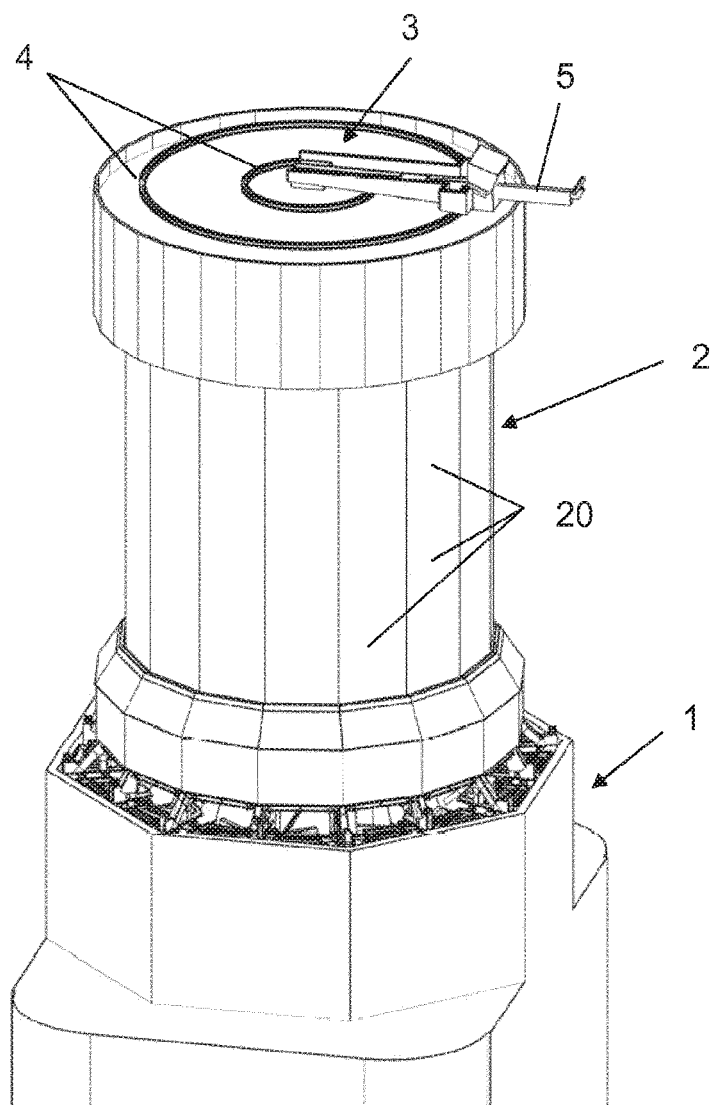
FIG. 1 illustrates an overview of one embodiment of the solar receiver and of the crane of the maintenance system according to the present invention showing the crane installed atop the receiver.

The invention aims to provide a solution that allows a simple, quick and effective performance of assembly and maintenance operations on the external solar receivers installed atop a concentrated solar power plant tower.

Furthermore, the invention aims to propose a piece of maintenance equipment arranged permanently at the solar tower, with the possibility of easily parking this equipment when it is not in use.

The invention also aims to provide a lifting system with an offset of the load allowing the operators to move easily towards the receiver during the implementation of this system.

A first aspect of the present invention relates to a tower for a concentrated solar power plant comprising an upper external platform on which is arranged an essentially cylindrical solar receiver with an external side surface and an upper base, the side surface of the receiver comprising a plurality of removably mounted receiving panels and a placement and maintenance system for the receiving panels, characterized in that the placement and maintenance system for the receiving panels comprises a crane mounted rotating 360° and guided using at least two concentric rails, on the upper base of the receiver.

According to preferred embodiments of the invention, the tower for a concentrated solar power plant further comprises at least one of the following features, or any suitable combination of several of them:
  the crane is arranged essentially horizontally and is provided with a telescoping arm with a winch making it possible to unwind a cable;
  the crane is installed permanently on the tower;
  the placement and maintenance system for the receiving panels also comprises a cradle able to accommodate at least one maintenance operator, secured to a mechanical pantograph scale device suitable for giving the cradle:
    either a standby position on the external platform of the tower;
    or a position in which the pantograph is not (fully) deployed for interventions at a heat shield of the receiver;
    or a position in which the pantograph is deployed for interventions on a receiving panel;
  the mechanical pantograph scale device comprises a counterweight, as well as a connecting arm to suspend the cradle-pantograph scale device assembly to the cable of the telescoping arm of the crane, the pantograph scale device allowing the cradle to move horizontally by deploying, folding, respectively, the pantograph, owing to an actuator thus making it possible to move the counterweight away from the cradle, bring the counterweight closer to the cradle, respectively;
  the counterweight is fastened either to a first end of a beam, or adjustably at another point of the beam, the other end of which is pivotally mounted on a first end of the pantograph, the second end of the pantograph being attached to the cradle;
  the actuator comprises a hydraulic jack connected between a fixed point of the beam and an end of the connecting arm making it possible to attach the cradle-pantograph scale device assembly to the cable of the crane;
  the pantograph is made up of a first stirrup pivotally mounted on the beam and on a second stirrup, attached to the cradle, of a pivot plate pivotally mounted on a central point of the first stirrup and pivotally mounted at both of its ends on a first end of two bars respectively articulated at their other end on the beam and on the second stirrup.

A second aspect of the present invention relates to a method for placing/removing a receiving panel in a tower for a concentrated solar power plant, as described above, at a location provided to that end on the external side surface of the receiver, characterized by at least the following successive steps:
  for placement, the crane is oriented along the azimuth where the position of the panel to be (re)placed is located,
  the telescoping arm of the crane is deployed,
  the cable is unwound and the receiving panel is attached thereto either at the base of the tower or at the platform at the base of the receiver,
  the panel is raised by winding the cable up to the height of the location provided for placement,
  the telescoping arm of the crane is partially retracted to bring the panel closer to the location,
  the panel is secured to the receiver in this location,
  the removal operations being performed in reverse relative to the above sequence.

A third aspect of the present invention relates to a maintenance method for a receiving panel in position in a tower for a concentrated solar power plant, as described above, characterized by at least the following successive steps:
  the telescoping arm of the crane is deployed, the cable is unwound and it is attached to the cradle-pantograph scale device assembly which is in standby on the platform of the tower, at the base of the receiver, the pantograph being in the non-deployed position,
  the cradle-pantograph scale device assembly is raised,
  the crane is oriented along the azimuth where the position of the panel to be maintained is located,
  the cradle-pantograph scale device assembly is brought closer to the receiver using the crane,
  the cradle is brought into the vicinity of the panel to be maintained by deploying the pantograph.

A fourth aspect of the present invention relates to a maintenance method on a heat shield located in front of a receiver on a tower for a concentrated solar power plant, as described above, characterized by at least the following successive steps:

the telescoping arm of the crane is deployed, the cable is unwound and it is attached to the cradle-pantograph scale device assembly, which is in standby on the platform of the tower, at the base of the receiver, the pantograph being in the non-deployed position, the cradle-pantograph scale device assembly is raised, the crane is oriented along the azimuth where the location of the heat shield where the maintenance has to be performed is located, the cradle-pantograph scale device assembly is brought closer to the heat shield using the crane, the pantograph still not being deployed, if necessary, the cradle is brought into the vicinity of the heat shield by deploying the pantograph at least partially.

Figure 4:
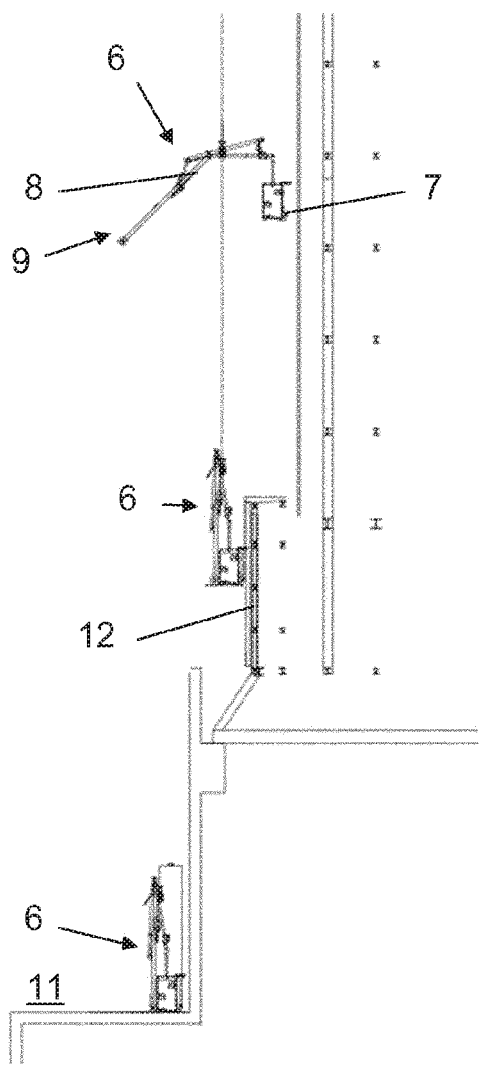
FIG. 4 shows an overview with the different possible positions for the cradle: non-deployed pantograph and cradle in standby on the platform or along the heat shield, deployed pantograph and cradle along the panel.

The solution proposed within the framework of the present invention relates to a method and system for maintaining external solar receivers 2 installed atop a tower 1 (FIGS. 1 and 4).

The system is made up of:

a crane 3 designed and dimensioned to support very heavy loads, such as the weight of a panel with a safety margin, and installed atop the solar receiver 2, i.e., on the platform located at the apex thereof;

concentric guide rails 4 installed on the platform atop the solar receiver 2 and which ensure the (azimuth) rotational guiding of the arm 5 of the crane 3;

a pantograph 8 cradle 7 balanced by a scale device 9 to intervene directly on the panels 20 of the receiver 2.

In the case of a maintenance operation, the cradle 7 will be used for:

the maintenance of the panels, including sanding and painting;

the maintenance of the refractories.

In the case of the replacement of a panel 20, the maintenance method is made up of the following steps:

deploying the crane 3;

separating, taking the panel 20 to be replaced on the receiver and moving it to the provided position;

lowering the panel 20;

taking a new panel 20;

raising the new panel 20 atop the tower, at the height of its location on the receiver 2;

replacing the panel 20 (by inserting the new panel).

The advantages of the proposed solution are:

a compact, high-capacity crane, installed permanently, is usable for continuous inspection and maintenance of the solar receiver;

a pantograph cradle balanced by a scale that ensures, with stability, high accessibility for the maintenance staff to the various components of the solar receiver;

the possibility of replacing an entire panel;

the possibility of intervening on each heat exchange tube of the panel;

ensuring an effective inspection of the solar receiver;

ensuring the sanding and repainting of the receiver.

Figure 2A:
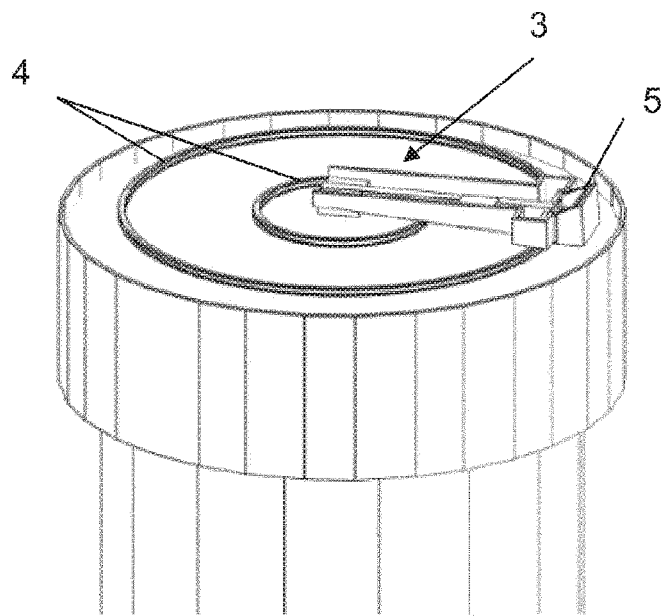
Figure 2B:
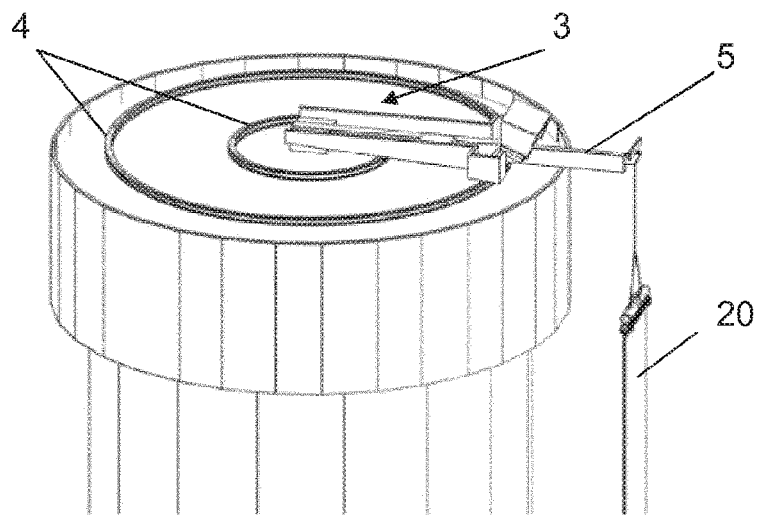
FIG. 2B shows the crane in the deployment position.

According to a first preferred embodiment of the invention, the crane 3, for example of the type with telescoping horizontal arms 5, is installed atop a solar receiver 2 and guided in 360-degrees rotation by concentric rails 4, of which there are at least two. This crane has two positions: a standby position and an operational position of deployment. These different positions are respectively shown in FIGS. 1, 2A and 2B.

FIGS. 3A to 3D show the different steps necessary for the installation or exchange of the solar panels 20 during a maintenance operation. In this instance, these figures show the placement of a new panel. The reverse operations are of course performed during the removal of a panel.

Figure 3A:
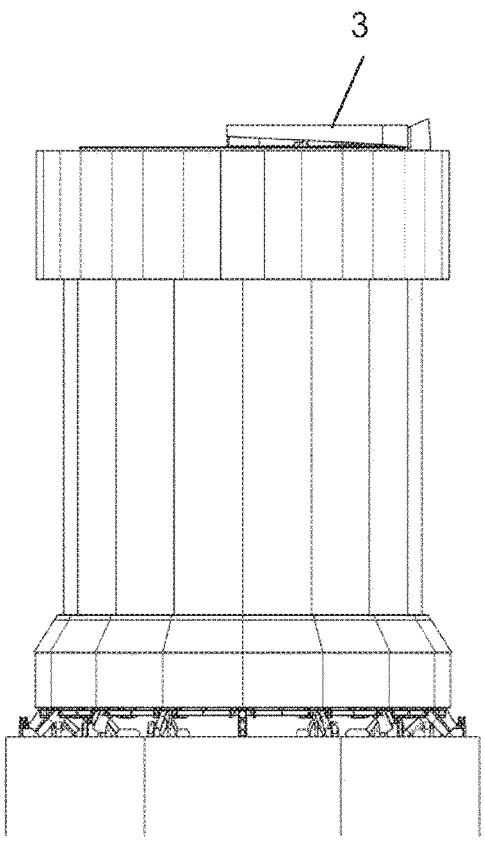
FIGS. 3A to 3D illustrate views for the different consecutive steps necessary to install the panels during an assembly or maintenance operation according to the invention (more particularly during the replacement of a panel), i.e., respectively with a non-deployed crane, with a deployed crane, when taking and raising the panel atop the tower from the ground or from the top of the structure supporting the receiver (platform) by means of the crane and when moving closer/replacing the panel.
Figure 3B:
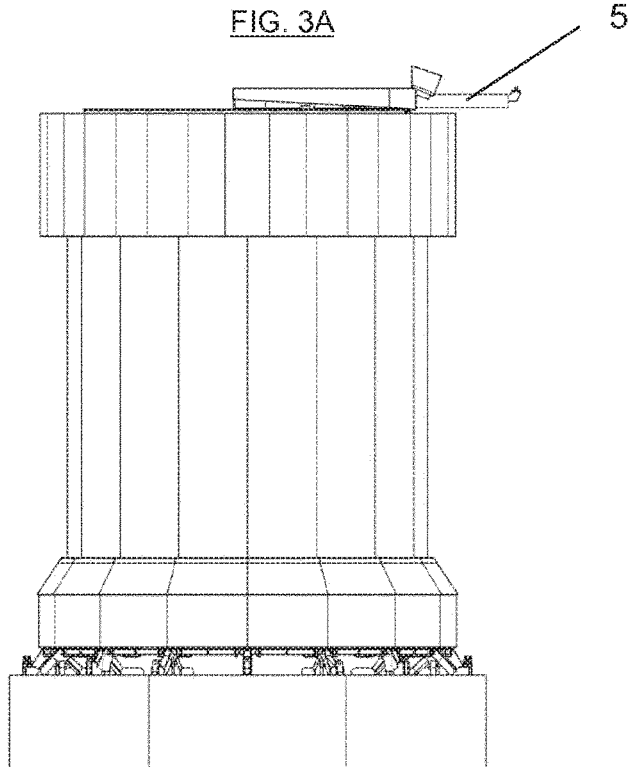
Figure 3C:
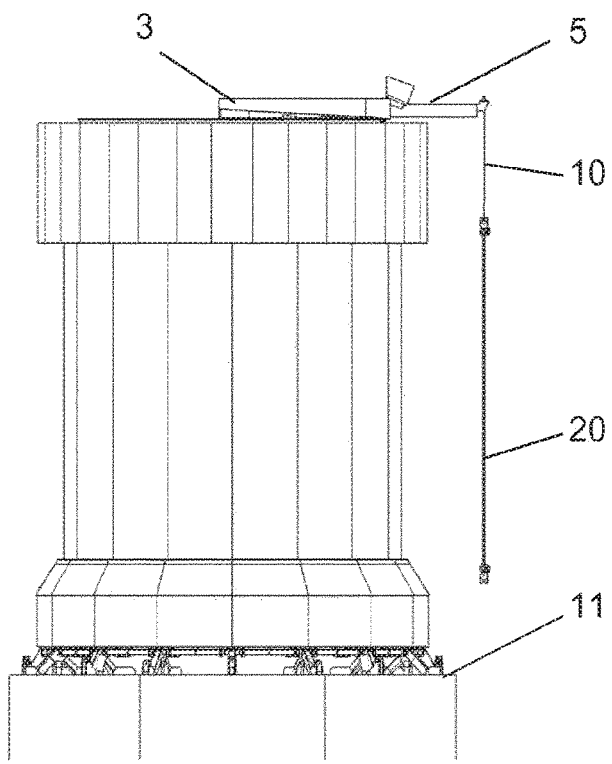
Figure 3D:
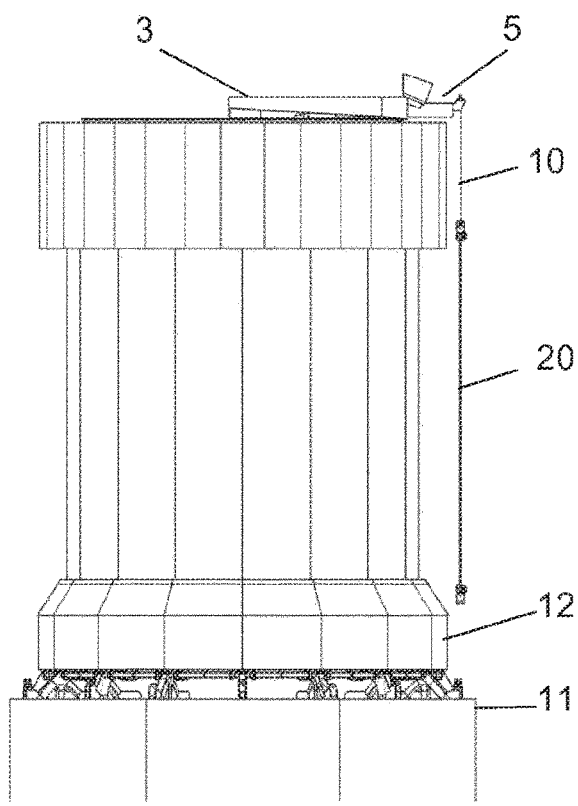

The arm of the crane 5 is first deployed (FIGS. 3A and 3B). Owing to a cable 10 attached to the end of the deployed arm 5 of the crane, the panel 20 to be placed is conveyed from the ground or the platform 11 of the tower on which the receiver 2 is installed, to the height of the location where it will be placed, optionally with a rotation of the crane, not shown (FIGS. 3C and 3D).

Figure 5:
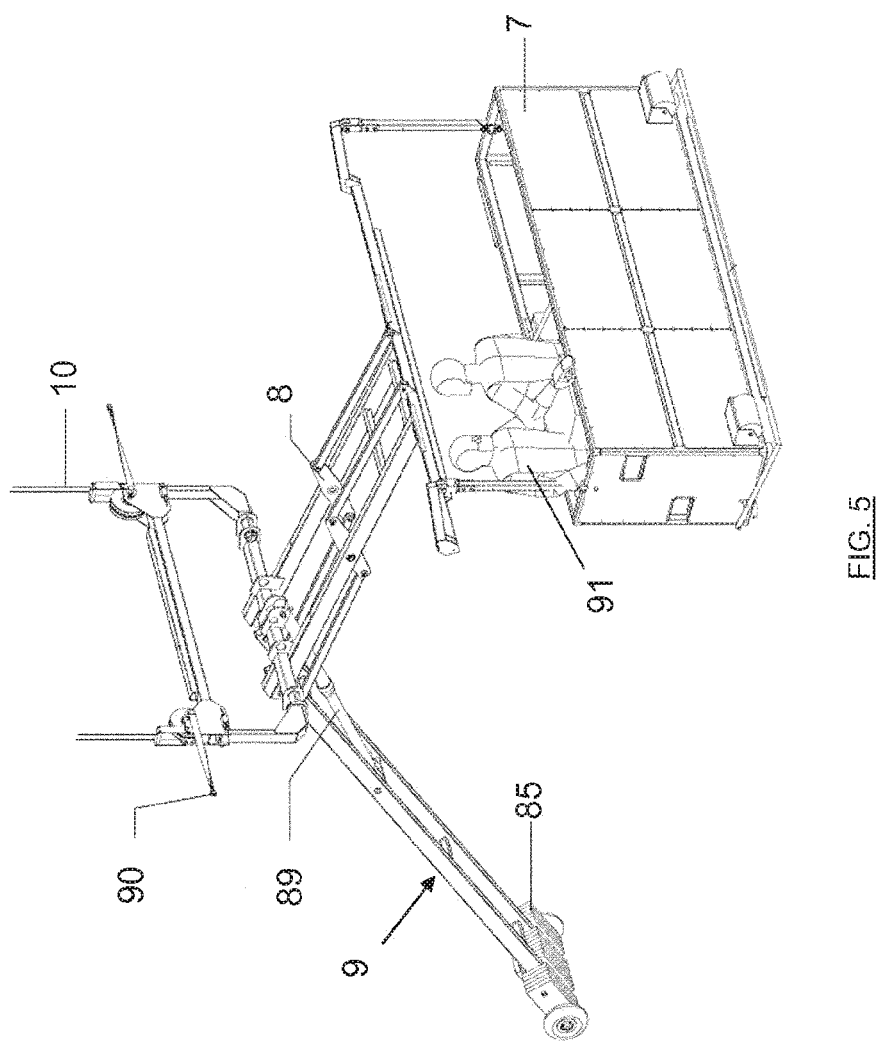
FIGS. 5 and 6 are detailed views showing the cradle and the pantograph scale device of FIG. 4, the pantograph being deployed or folded depending on the case.
Figure 6:
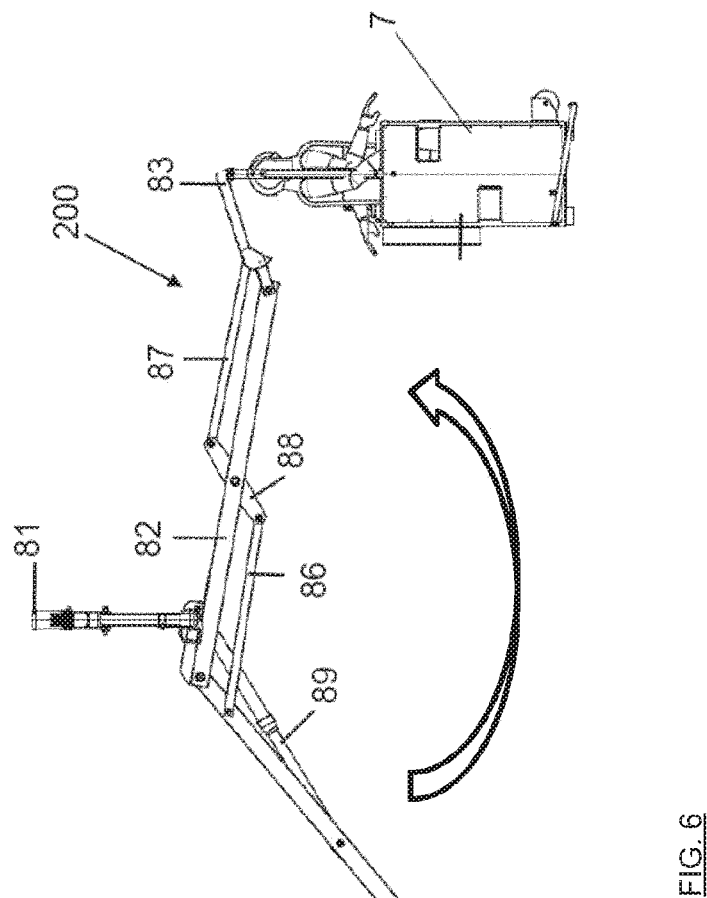
Figure 6:
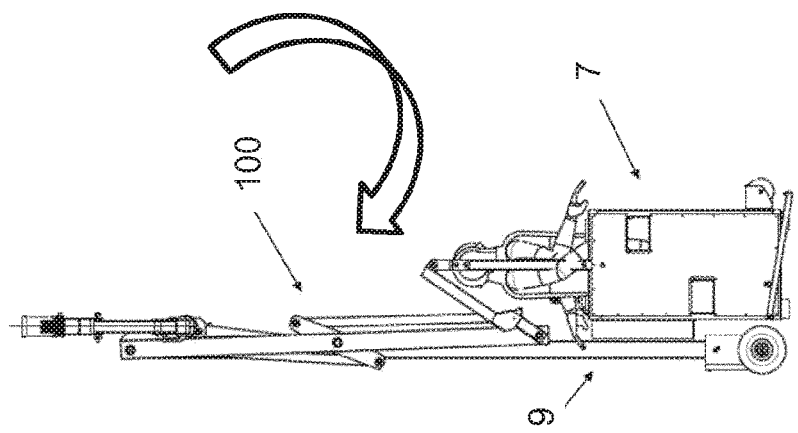

According to a second preferred embodiment of the invention, during maintenance operations requiring the intervention of operators, a cradle 7 secured to a pantograph 8 is used, as shown in FIG. 5, allowing the horizontal and offset movement of the cradle, balanced by a scale system 9. FIG. 6 shows the positioning of the cradle 7 on the one hand when the pantograph 8 is in the folded configuration 100 and on the other hand when the pantograph is in the deployed configuration 200.

The pantograph is a mechanical device well known by those skilled in the art, based on an articulated parallelogram or on more complex alternatives, which will be used in this case for its very precise positioning capability and its ability to fold the cradle device into a compact space.

According to the example of non-limiting embodiment of the subject-matter covered by the present invention, shown in FIGS. 5 and 6, the cradle 7, able to accommodate at least one maintenance operator 91, is secured to the mechanical pantograph 8 scale device 9 comprising a counterweight 85, as well as a connecting arm 81 to suspend the cradle-pantograph scale device assembly 7, 8, 9 to the cable 10 of the telescoping arm 5 of the crane 3, the pantograph scale device 8, 9 allowing the cradle 7 to move horizontally by deploying, folding, respectively, the pantograph 8, owing to an actuator 89 thus making it possible to move the counterweight 85 away from the cradle 7, bring the counterweight 85 closer to the cradle 7, respectively. The counterweight 85 is fastened to a first end of a beam 84, the other end of which is pivotally mounted on a first end of the pantograph 8, the second end of the pantograph 8 being attached to the cradle 7. The actuator 89 comprises a hydraulic jack connected between a fixed point of the beam 84 and an end of the connecting arm 81 making it possible to attach the cradle-pantograph scale device assembly 7, 8, 9 to the cable 10 of the crane 3.

In one particular embodiment, the counterweight 85 can be fastened, adjustably, to different locations of the beam 84. In this case, the scale device 9 obeys the known principle of the steelyard-lever scale.

Still as a non-limiting example, the pantograph 8 is made up of a first stirrup 82 pivotally mounted on the beam 84 and on a second stirrup 83, attached to the cradle 7, of a pivot plate 88 pivotally mounted on a central point of the first stirrup 82 and pivotally mounted at both of its ends on a first end of two bars 86, 87 respectively articulated at their other end on the beam 84 and on the second stirrup 83.

Nevertheless, the invention, not limited to the device described above, covers all the mechanical devices making it possible to obtain the following different possible positions of the cradle 7 (see FIGS. 4, 5):

"standby" position: standby position on the external platform 11 of the tower 1 (FIGS. 4 and 6, left);

position with pantograph 8 not deployed: for interventions at the heat shield 12 (FIGS. 4 and 6, left);

position with pantograph 8 deployed: for interventions on the receiving panel 20 (FIGS. 4, 5 and 6, right).

The invention also relates to all embodiments that may pertain to optimizations of the sizing of the crane and/or the cradle, in particular relative to:
- increasing the length and/or height of the cradle,
- increasing the actuating distance of the pantograph,
- increasing the length of the arm of the pantograph.

The environmental impact of this invention may also be taken into account by:
- optimizing the design of the crane and the cradle in order to lighten their weight (less material), and consequently to reduce their environmental impact,
- using steel, which is a recyclable material, as a major element,
- adopting a manufacturing method for the system reducing the environmental impact,
- choosing, as the motors that actuate the crane, low-consumption electric motors, therefore without $CO_2$ emissions.

The equipment according to the present invention belongs to the field of rotary cranes equipped with a foldable (steelyard-lever) scale effect cradle and has the advantageous effects thereof:
- precise positioning;
- possible stowage of the cradle structure;
- returning the loads to the rolling path of the crane.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Solar tower
2 Solar receiver
3 Crane
4 Guide rails
5 Telescoping crane arm
6 Cradle and pantograph assembly
7 Cradle
8 Pantograph
9 Scale device
10 Crane cable
11 Platform
12 Heat shield
20 Receiving panel
81 Connecting arm
82 Primary stirrup
83 Secondary stirrup
84 Beam
85 Counterweight
86 Bar
87 Bar
88 Pivot plate
89 Hydraulic jack
90 Pulley
91 Maintenance operator
100 Folded position of the pantograph
200 Deployed position of the pantograph

The invention claimed is:

1. A tower for a concentrated solar power plant, comprising:
an upper external platform;
a cylindrical solar receiver arranged on the upper external platform, the cylindrical solar receiver having an external side surface and an upper base, the external side surface of the receiver comprising a plurality of removably mounted receiving panels, the cylindrical solar receiver further comprising a heat shield;
a placement and maintenance system for the receiving panels, the placement and maintenance system comprising a mechanical pantograph scale device comprising a pantograph and a scale device, a crane mounted on the upper base of the receiver, the crane being rotatable 360° and guided using at least two concentric rails, the crane having a telescoping arm and a cable connected to the mechanical pantograph scale device, the placement and maintenance system further comprising a cradle configured to accommodate at least one maintenance operator, the cradle being secured to the mechanical pantograph scale device,
wherein the mechanical pantograph scale device is configured to place the cradle in:
a standby position on the upper external platform;
a position to access the heat shield of the cylindrical solar receiver, in which position the mechanical pantograph scale device is not fully deployed; and
a position to access at least one of the plurality of removably mounted receiving panels, in which position the mechanical pantograph scale device is fully deployed, and
wherein the mechanical pantograph scale device comprises a counterweight, an actuator, and a connecting arm configured to suspend an assembly of the cradle and mechanical pantograph scale device to the cable of the telescoping arm of the crane, the mechanical pantograph scale device being configured, using the actuator, to move the cradle horizontally between a deployed position in which the counterweight is moved away from the cradle, and a folded position in which the counterweight is moved closer to the cradle.

2. The tower of claim 1, wherein the crane is arranged horizontally, and the telescoping arm comprises a winch configured to unwind the cable.

3. The tower of claim 1, wherein the crane is installed permanently on the tower.

4. The tower of claim 1, wherein the mechanical pantograph scale device comprises a beam, and
   wherein the counterweight is fastened either to a first end of the beam, or adjustably at another point of the beam, a second end of the beam being pivotally mounted on a first end of the pantograph, a second end of the pantograph being attached to the cradle.

5. The tower for a concentrated solar power plant according to claim 4, wherein the actuator comprises a hydraulic jack connected between a fixed point of the beam and an end of the connecting arm so as to attach the assembly of the cradle and mechanical pantograph scale device to the cable of the crane.

6. The tower of claim 1, wherein the pantograph scale device comprises a beam,
   wherein the pantograph comprises two bars, a pivot plate, a first stirrup, and a second stirrup, the first stirrup being pivotally mounted on the beam and on the second stirrup,
   wherein the second stirrup is attached to the cradle,
   wherein the pivot plate is pivotally mounted on a central point of the first stirrup,
   wherein the pivot plate is pivotally mounted at a first end of the pivot plate on a first end of a first of the two bars, and at a second end of the pivot plate on a first end of the second of the two bars,
   wherein a second end of the first of the two bars is pivotally mounted on the beam, and
   wherein a second end of the second of the two bars is pivotally mounted on the second stirrup.

7. A method for placing/removing a receiving panel in the tower of claim 1, at a location provided on the external side surface of the receiver, the method comprising, successively:
   orienting the crane along an azimuth where a position of the panel to be placed/replaced is located;
   deploying a telescoping arm of the crane;
   unwinding a cable and attaching the receiving panel thereto either at a base of the tower or at a platform at the base of the receiver;
   raising the panel by winding the cable up to a height of the location provided for placement;
   partially retracting the telescoping arm of the crane to bring the panel closer to the location;
   securing the panel to the receiver in this location; and
   performing removal operations in reverse relative to the above sequence.

8. A maintenance method for a receiving panel in position in the tower of claim 1, the method comprising, successively:
   deploying the telescoping arm of the crane;
   unwinding the cable and attaching the cable to the cradle-pantograph scale device assembly, which is in standby on a platform of the tower, at the base of the receiver, the pantograph being in a non-deployed position;
   raising the cradle-pantograph scale device assembly;
   orienting the crane along an azimuth where a position of the panel to be maintained is located;
   bringing the cradle-pantograph scale device assembly closer to the receiver using the crane; and
   bringing the cradle into a vicinity of the panel to be maintained by deploying the pantograph.

9. A maintenance method on a heat shield located in front of the receiver on the tower of claim 1, the method comprising, successively:
   deploying a telescoping arm of the crane;
   unwinding a cable and attaching the cable to the cradle-pantograph scale device assembly, which is in standby on a platform of the tower, at the base of the receiver, the pantograph being in a non-deployed position;
   raising the cradle-pantograph scale device assembly;
   orienting the crane along an azimuth where a location of the heat shield where the maintenance has to be performed is located;
   bringing the cradle-pantograph scale device assembly closer to the heat shield using the crane, the pantograph still not being deployed; and
   if necessary, bringing the cradle into a vicinity of the heat shield by deploying the pantograph at least partially.

10. A tower for a concentrated solar power plant, comprising:
    an upper external platform on which is arranged an cylindrical solar receiver with an external side surface and an upper base, the side surface of the receiver comprising a plurality of removably mounted receiving panels; and
    a placement and maintenance system for the receiving panels,
    wherein the placement and maintenance system for the receiving panels comprises a crane mounted so as to be rotatable 360° and guided using at least two concentric rails, on the upper base of the receiver,
    wherein the placement and maintenance system comprises a cradle configured to accommodate at least one maintenance operator, secured to a mechanical pantograph scale device comprising a pantograph, the mechanical pantograph scale device being configured for giving the cradle:
       either a standby position on an external platform of the tower;
       or a position in which the pantograph is not fully deployed for interventions at a heat shield of the receiver;
       or a position in which the pantograph is deployed for interventions on a receiving panel,
    wherein the mechanical pantograph scale device comprises a counterweight, and a connecting arm configured to suspend an assembly of the cradle and mechanical pantograph scale device to a cable of a telescoping arm of the crane, the pantograph scale device being configured to allow the cradle to move horizontally by deploying, folding, respectively, the pantograph, using an actuator so as to move the counterweight away from the cradle, bringing the counterweight closer to the cradle, respectively,
    wherein the mechanical pantograph scale device comprises a beam,
    wherein the counterweight is fastened either to a first end of the beam, or adjustably at another point of the beam, a second end of the beam being pivotally mounted on a first end of the pantograph, a second end of the pantograph being attached to the cradle, and
    wherein the actuator comprises a hydraulic jack connected between a fixed point of the beam and an end of the connecting arm so as to attach the assembly of the cradle and mechanical pantograph scale device to the cable of the crane.

* * * * *